United States Patent
Zhang et al.

(10) Patent No.: US 11,776,200 B2
(45) Date of Patent: Oct. 3, 2023

(54) IMAGE RELIGHTING

(71) Applicant: Ford Global Technologies, LLC, Dearborn, MI (US)

(72) Inventors: Xianling Zhang, San Jose, CA (US); Nathan Tseng, Canton, MI (US); Nikita Jaipuria, Union City, CA (US); Rohan Bhasin, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 17/523,210

(22) Filed: Nov. 10, 2021

(65) Prior Publication Data

US 2023/0143816 A1  May 11, 2023

(51) Int. Cl.
*G06T 15/50* (2011.01)
*G06T 15/20* (2011.01)
*G06T 15/00* (2011.01)
*G06V 10/75* (2022.01)

(52) U.S. Cl.
CPC ............ *G06T 15/50* (2013.01); *G06T 15/005* (2013.01); *G06T 15/205* (2013.01); *G06V 10/758* (2022.01)

(58) Field of Classification Search
None
See application file for complete search history.

(56) References Cited

U.S. PATENT DOCUMENTS

| | | | |
|---|---|---|---|
| 8,294,794 B2 | 10/2012 | Zhang et al. | |
| 9,892,550 B2 | 2/2018 | Ma et al. | |
| 10,504,282 B2 | 12/2019 | Levinson et al. | |
| 10,997,457 B2 | 5/2021 | Rhemann et al. | |
| 2014/0028801 A1* | 1/2014 | Tin | H04N 13/204 348/136 |
| 2015/0097834 A1* | 4/2015 | Ma | G06T 17/05 345/426 |
| 2017/0103091 A1 | 4/2017 | Kontkanen | |
| 2019/0266789 A1* | 8/2019 | Rezaiifar | G06T 7/194 |
| 2021/0034914 A1* | 2/2021 | Bansal | G05D 1/0212 |

(Continued)

FOREIGN PATENT DOCUMENTS

| | | | |
|---|---|---|---|
| CN | 108765540 | * 11/2018 | ............... G06N 3/04 |
| CN | 108765540 A | 11/2018 | |

(Continued)

OTHER PUBLICATIONS

Carlson et al., "Shadow Transfer: Single Image Relighting for Urban Road Scenes", arXiv:1909.10363v2 [cs.CV] Sep. 26, 2019.

(Continued)

*Primary Examiner* — Andrew G Yang
(74) *Attorney, Agent, or Firm* — Frank A. MacKenzie; Bejin Bieneman PLC

(57) ABSTRACT

A computer includes a processor and a memory storing instructions executable by the processor to receive a plurality of first images of an environment in a first lighting condition, classify pixels of the first images into categories, mask the pixels belonging to at least one of the categories from the first images, generate a three-dimensional representation of the environment based on the masked first images, and generate a second image of the environment in a second lighting condition based on the three-dimensional representation and on a first one of the first images.

16 Claims, 9 Drawing Sheets

(56) References Cited

U.S. PATENT DOCUMENTS

| | | | |
|---|---|---|---|
| 2021/0037195 A1 | 2/2021 | Cutler et al. | |
| 2021/0263152 A1* | 8/2021 | Halder | G05D 1/0088 |
| 2021/0358204 A1* | 11/2021 | Yoneda | G06T 7/174 |
| 2022/0309745 A1* | 9/2022 | Bigos | G06T 15/80 |

FOREIGN PATENT DOCUMENTS

| | | | | |
|---|---|---|---|---|
| CN | 113139917 | * | 7/2021 | G06T 5/00 |
| JP | 2019219928 | * | 12/2019 | G06T 15/50 |
| WO | 2019182782 A1 | | 9/2019 | |

OTHER PUBLICATIONS

Einabadi et al., "Deep Neural Models for Illumination Estimation and Relighting: A Survey", Computer Graphics forum, vol. 0 (2021), No. 0 pp. 1-17, DOI: 10.1111/cgf.14283.

Philip et al., "Multi-view Relighting using a Geometry-Aware Network", ACM Trans. Graph., vol. 38, No. 4, Article 78. Publication date: Jul. 2019.

Philip et al., "Supplemental for: Multi-view Relighting using a Geometry-Aware Network", ACM Trans. Graph., vol. 38, No. 4, Article 78. Publication date: Jul. 2019.

Rantfl et al., "Towards Robust Monocular Depth Estimation: Mixing Datasets for Zero-shot Cross-dataset Transfer", arXiv:1907.01341v3 [cs.CV] Aug. 25, 2020.

Srinivasan et al., "NeRV: Neural Reflectance and Visibility Fields for Relighting and View Synthesis", arXiv:2012.03927v1 [cs.CV] Dec. 7, 2020.

Yu et al., "pixelNeRF: Neural Radiance Fields from One or Few Images", arXiv:2012.02190v3 [cs.CV] May 30, 2021.

Zhang et al., "A Driver Fatigue Recognition Algorithm Based on Spatio-Temporal Feature Sequence", https://ieeexplore.ieee.org/xpl/conhome/8955993/proceeding, DOI: 10.1109/CISP-BMEI48845.2019.8965990.

Zhang et al., "NeRFactor: Neural Factorization of Shape and Reflectance Under an Unknown Illumination", arXiv:2106 01970v1 [cs.CV] Jun. 3, 2021.

Hu et al., "Worldsheet: Wrapping the World in a 3D Sheet for View Synthesis from a Single Image", arXiv:2012.09854v3 [cs.CV] Aug. 18, 2021.

Non-Final Office Action for U.S. Appl. No. 17/523,157, filed Nov. 10, 2021, as issued by the USPTO dated Jan. 26, 2023.

* cited by examiner

IMAGE RELIGHTING

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more images sensors that can be processed to determine locations of objects. Object location data extracted from images can be used by a computer to operate systems including vehicles, robots, security, and object-tracking systems. Machine-learning algorithms can be used on board vehicles to operate advanced driver assistance systems (ADAS) or perform autonomous operation based on detecting objects in images, e.g., taken by cameras on board vehicles as the vehicles are driving.

DETAILED DESCRIPTION

Figure 1:
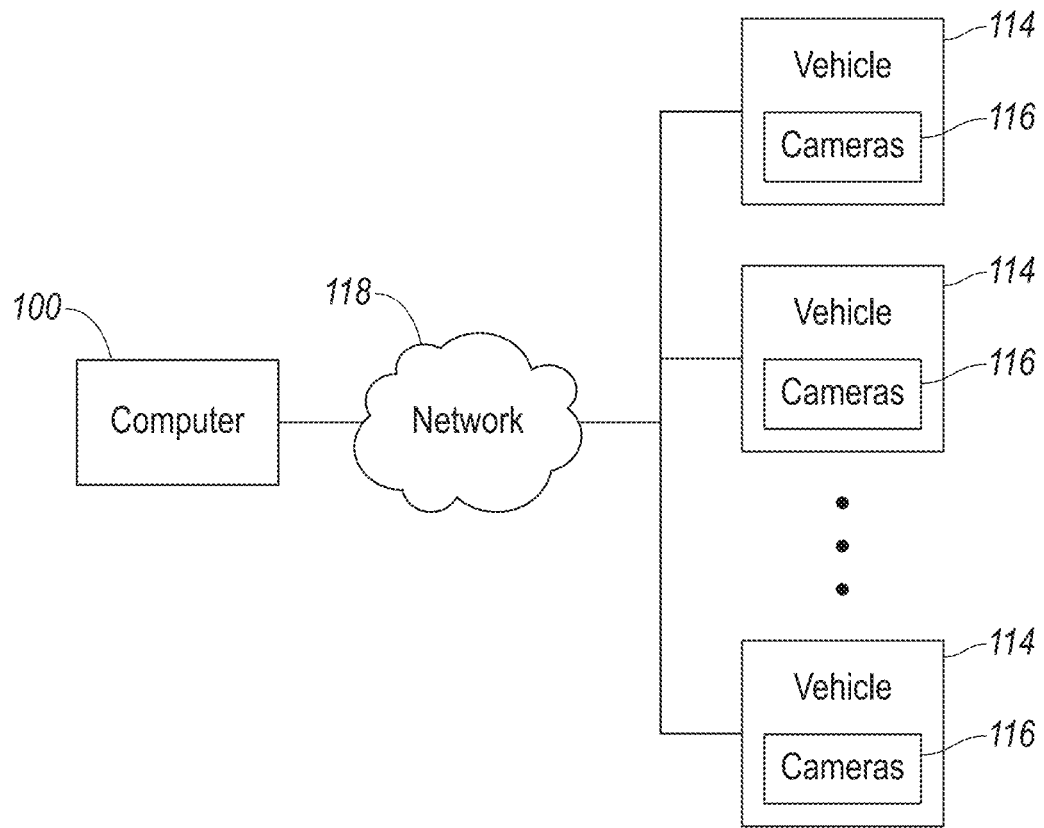
FIG. 1 is a block diagram of example vehicles collecting image data.

This disclosure provides techniques to use first images of an environment in a first lighting condition to generate a second image of the environment in a second lighting condition. The lighting condition can include, e.g., a light direction, e.g., a sun angle. The second image can be of the same environment from the same perspective as one of the first images but with different shadows from the different lighting condition. For the purposes of this disclosure, a perspective of an image is defined as a point of view of a camera that captured that image or, for artificially generated images, a point of view of a hypothetical camera that would have captured that image. For example, the first images (i.e., the natural images) can be of an environment including a roadway taken from a vehicle driving down the roadway at 9:00 AM, and the techniques herein can generate second images (i.e., artificial images) of the same environment from the same perspective as one of the first images as though taken at 12:00 noon, 3:00 PM, and 6:00 PM. Because the second images are artificially generated, the vehicle does not need to re-travel the roadway at the later times. Having a dataset of images of environments with a variety of lighting conditions can be useful for training a machine-learning algorithm for tasks such as object recognition that can depend on interpreting shadows.

Specifically, a computer can be programmed to receive a plurality of the first images of the environment in the first lighting condition, classify pixels of the first images into categories, mask the pixels belonging to at least one of the categories from the first images, generate a three-dimensional representation of the environment based on the masked first images, and generate the second image of the environment in the second lighting condition based on the three-dimensional representation and on a first one of the first images. The plurality of first images can all be taken along a roadway. The computer does not need the first images to be taken from 360° around the environment to generate the three-dimensional representation. Even though collecting multiple views around the environment can be feasible in many nonvehicle contexts, collecting views around an environment can be difficult using a camera on board a vehicle because collecting those views would typically require the vehicle to leave the roadway. The techniques herein avoid the difficulties related to collecting widely disparate views.

A computer includes a processor and a memory storing instructions executable by the processor to receive a plurality of first images of an environment in a first lighting condition, classify pixels of the first images into categories, mask the pixels belonging to at least one of the categories from the first images, generate a three-dimensional representation of the environment based on the masked first images, and generate a second image of the environment in a second lighting condition based on the three-dimensional representation and on a first one of the first images.

The second image and the first one of the first images may have a same perspective of the environment.

The instructions may further include instructions to generate a plurality of second images including the second image based on the three-dimensional representation and on the first images, the second images being in the second lighting condition. Each second image may have a same perspective of the environment as respective ones of the first images.

The at least one of the categories can include sky.

The first images may be of the environment at a series of points along a path through the environment. The path may extend along a roadway of the environment.

The three-dimensional representation may be a mesh. Generating the mesh may include generating a point cloud based on the masked first images and generating the mesh based on the point cloud. Generating the point cloud may include executing a first machine-learning algorithm, and the masked first images may be inputs to the first machine-learning algorithm.

The instructions may further include instructions to generate a shadow mask of the environment in the second lighting condition from a perspective of the first one of the first images, and generating the second image may be based on the shadow mask.

The instructions may further include instructions to generate a shadow mask of the first one of the first images, and generating the second image may be based on the shadow mask. The shadow mask may be a first shadow mask, the instructions may further include instructions to generate a second shadow mask of the environment in the second lighting condition from a perspective of the first one of the first images, and generating the second image may be based on the second shadow mask. The second lighting condition may include a light direction, and generating the second shadow mask may include determining shadow locations by projecting objects in the three-dimensional representation along the light direction.

Generating the second image may include executing a machine-learning algorithm, and the first one of the first images, the first shadow mask, and the second shadow mask may be inputs to the machine-learning algorithm. The machine-learning algorithm may be a first machine-learning algorithm, generating the first shadow mask may include executing a second machine-learning algorithm, generating the second shadow mask may include executing a third machine-learning algorithm, and the first images may be inputs to the second machine-learning algorithm and to the third machine-learning algorithm. The second lighting condition may include a light direction, generating the second shadow mask may include determining a preliminary second shadow mask having shadow locations by projecting objects in the three-dimensional representation along the light direction, and the preliminary second shadow mask may be an input to the second machine-learning algorithm.

The instructions may further include instructions to generate a reflectance map of the environment from a perspective of the first one of the first images based on the three-dimensional representation, the reflectance map may be a map of specular reflection direction based on a light direction of the second lighting condition, and generating the second image may be based on the reflectance map. The instructions may further include instructions to generate a normal map of the environment from the perspective of the first one of the first images based on the three-dimensional representation, and generating the reflectance map may be based on the normal map and the second lighting condition.

A method includes receiving a plurality of first images of an environment in a first lighting condition, classifying pixels of the first images into categories, masking the pixels belonging to at least one of the categories from the first images, generating a three-dimensional representation of the environment based on the masked first images, and generating a second image of the environment in a second lighting condition based on the three-dimensional representation and on a first one of the first images.

With reference to the Figures, wherein like numerals indicate like parts throughout the several views, a computer 100 includes a processor and a memory storing instructions executable by the processor to receive a plurality of first images 102 of an environment 104 in a first lighting condition, classify pixels of the first images 102 into categories 106, mask the pixels belonging to at least one of the categories 106 from the first images 102, generate a three-dimensional representation 108 of the environment 104 based on the masked first images 110, and generate a second image 112 of the environment 104 in a second lighting condition based on the three-dimensional representation 108 and on a first one of the first images 102. The instructions can include instructions to generate a plurality of second images 112 including the second image 112 based on the three-dimensional representation 108 and on the first images 102, and the second images 112 can be in the second lighting condition. The second images 112 can be from the respective perspectives 113 of the respective first images 102, either all the first images 102 or a subset of the first images 102.

With reference to FIG. 1, vehicles 114 may be used for collecting images of the environments 104. The vehicles 114 may be any passenger or commercial automobile such as a car, a truck, a sport utility vehicle, a crossover, a van, a minivan, a taxi, a bus, etc.

The vehicles 114 can each include one or more cameras 116. The cameras 116 can detect electromagnetic radiation in some range of wavelengths. For example, the cameras 116 may detect visible light, infrared radiation, ultraviolet light, or some range of wavelengths including visible, infrared, and/or ultraviolet light. For example, the cameras 116 can be charge-coupled devices (CCD), complementary metal oxide semiconductors (CMOS), or any other suitable type.

The vehicles 114 can transmit images from the cameras 116 to the computer 100 via a network 118. The network 118 represents one or more mechanisms by which the computer 100 may communicate with a remote server. Accordingly, the network 118 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The computer 100 is a microprocessor-based computing device, e.g., a generic computing device including a processor and a memory. The memory of the computer 100 can include media for storing instructions executable by the processor as well as for electronically storing data and/or databases. The computer 100 can be multiple computers coupled together.

Figure 2:
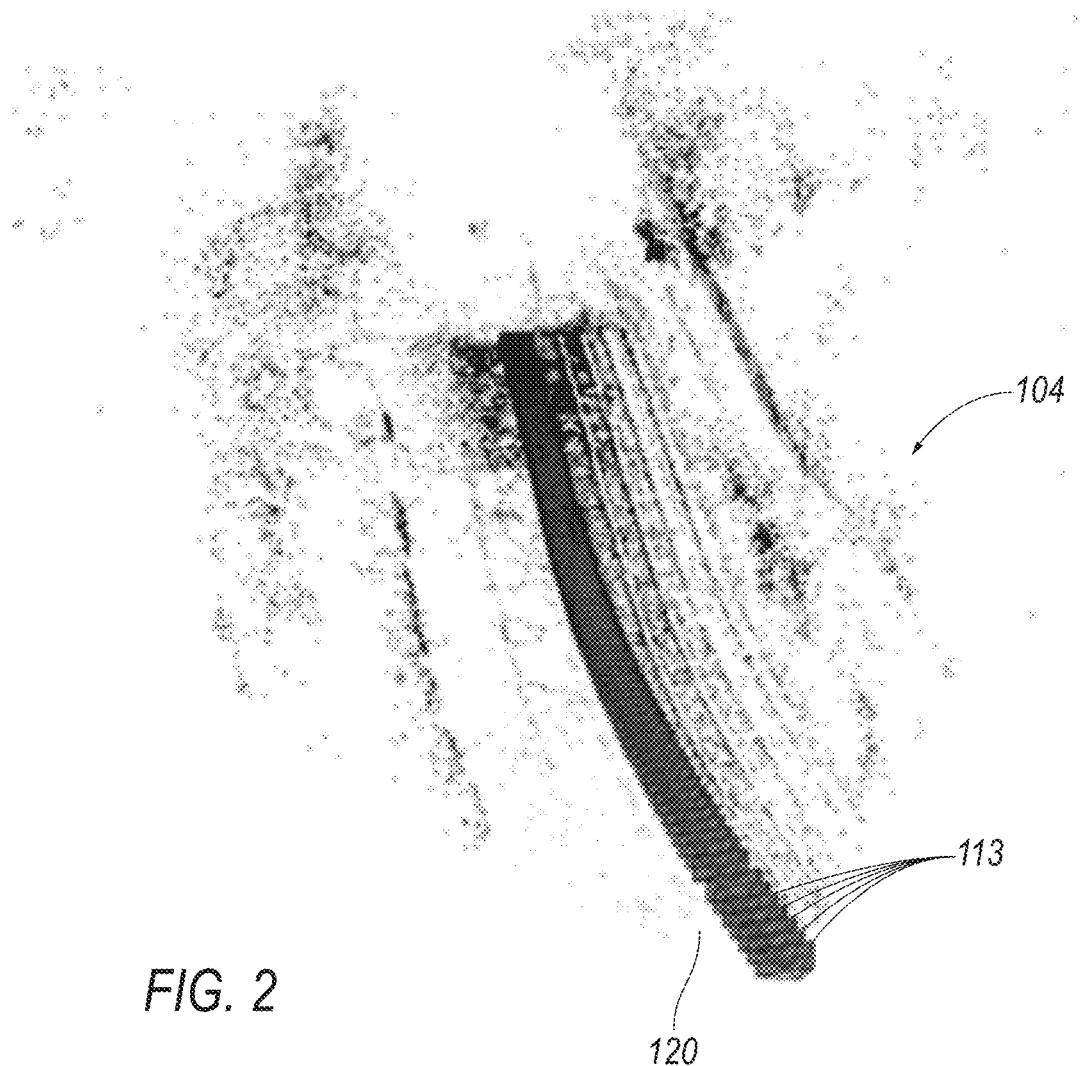
FIG. 2 is a diagram of example camera perspectives along a path through an example environment.
Figure 3:
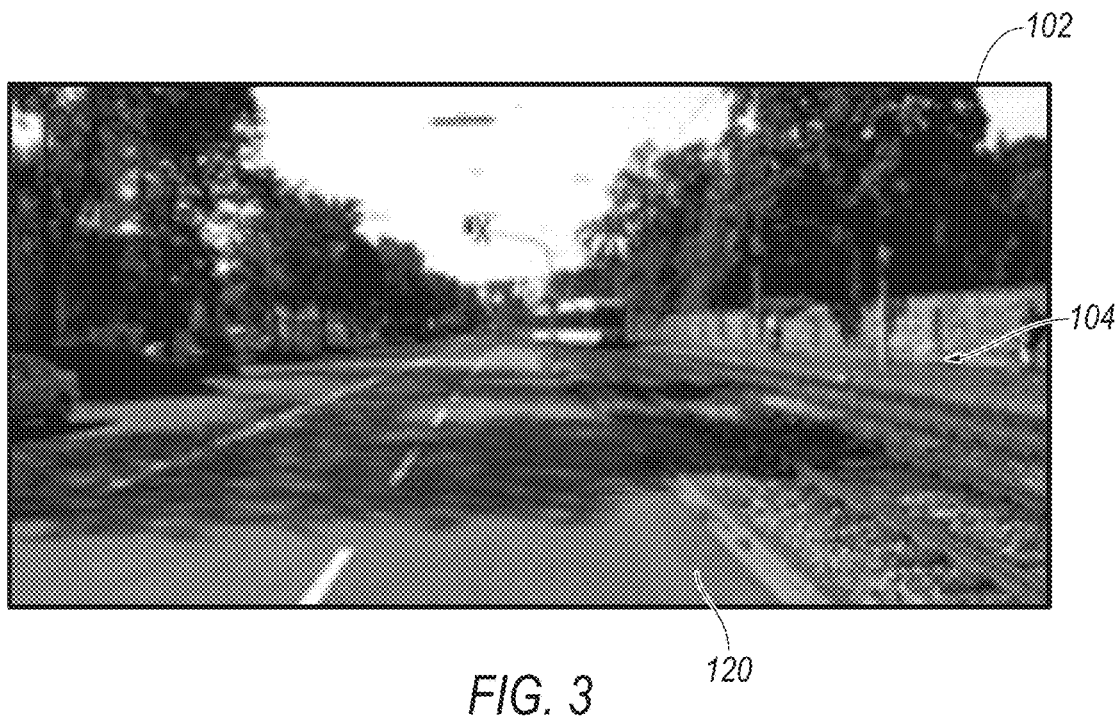
FIG. 3 is an image of the environment in a first lighting condition.

With reference to FIG. 2, one of the cameras 116 can capture the first images 102 (shown in FIG. 3). The first images 102 can be of the environment 104 at a series of points along a path through the environment 104. The path can extend along a roadway 120 of the environment 104. The first images 102 can all be from perspectives 113 aimed in a same direction along the path, e.g., all from a forward-facing camera 116 of a vehicle 114 traveling one way along the roadway 120. The first images 102 do not need to be taken from 360° around the environment 104, i.e., can be from a more limited set of views than views from 360° around the environment 104.

With reference to FIG. 3, the computer 100 can receive the first images 102, either from one of the cameras 116 on board one of the vehicles 114 or from another source. The first images 102 (as well as the artificially generated second images 112) can each be a two-dimensional matrix of pixels. The first images 102 and second images 112 can be color images. Each pixel can have a color represented as one or more numerical values, e.g., values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image, i.e., position in the field of view of the camera 116, can be specified in pixel dimensions or coordinates, e.g., an ordered pair of pixel distances, such as a number of pixels from a top edge and a number of pixels from a left edge of the field of view.

The first images 102 and the second images 112 depict a common environment 104. The environment 104 can include various physical features or attributes, e.g., objects, terrain features, etc. For example, in FIG. 3, the first image 102 was captured by a forward-facing camera 116 on board a vehicle 114, and the environment 104 in the first image 102 includes the roadway 120 on which the vehicle 114 is traveling, railroad tracks alongside the roadway 120, a wall along the railroad tracks, trees, a traffic light, sky, etc.

The environment 104 as depicted in the first image 102 is in a first lighting condition, and the environment 104 as depicted in the second image 112 (shown in FIG. 10) is in a second lighting condition. The lighting condition defines how light is transmitted through the environment 104. For example, a lighting condition can include a light direction (e.g., sun angle), light diffuseness (e.g., clear or overcast sky), locations and directions of point sources of light (e.g., streetlamps), etc.

Figure 4:
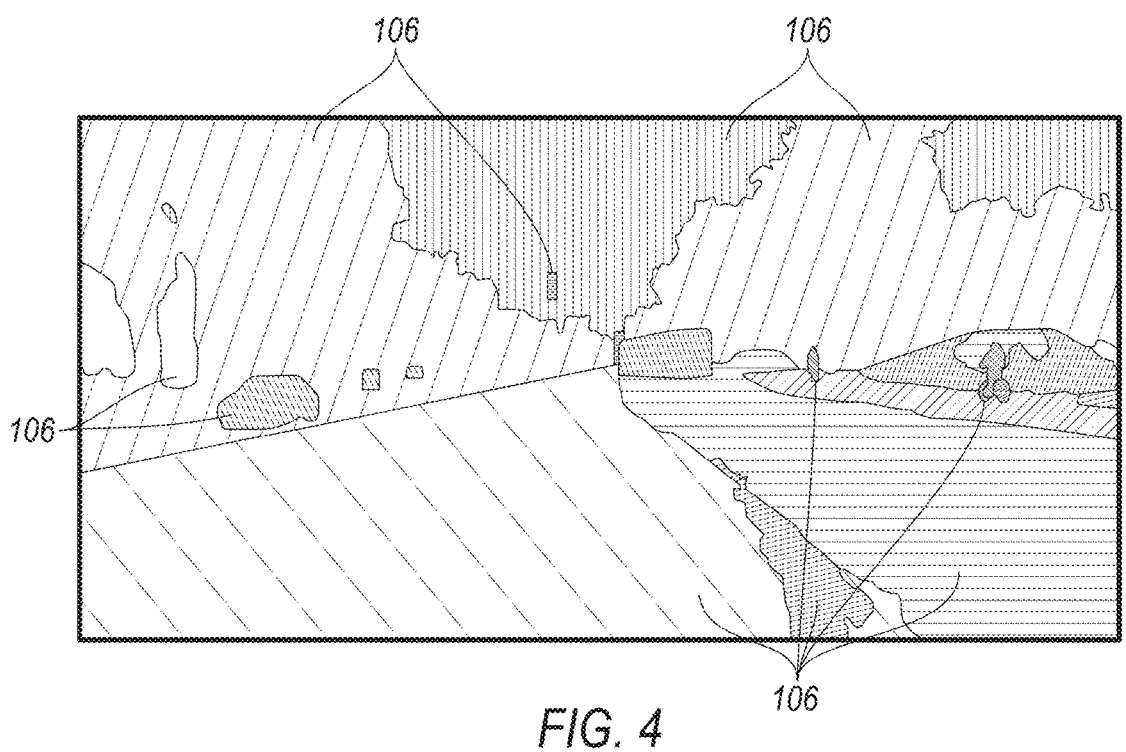
FIG. 4 is an image of example pixel classifications of the image of the environment.

With reference to FIG. 4, the computer 100 can classify the pixels of the first images 102 into the categories 106. The categories 106 can be stored in the computer 100 as a list, e.g., {road, sidewalk, ground, trees, motor vehicle, bicycle, pedestrian, animal, building/wall, traffic sign, traffic light, sky}. For example, the computer 100 can execute a semantic segmentation algorithm. A semantic segmentation algorithm labels each pixel in an image with a category 106. The semantic segmentation algorithm can be a machine-learning algorithm, e.g., a deep neural network, a convolutional neural network, etc. One such machine-learning algorithm for performing semantic segmentation is Detectron2.

Figure 5:
FIG. 5 is an image of the environment in the first lighting condition with some pixels masked.

With reference to FIG. 5, the computer 100 can mask the pixels belonging to at least one of the categories 106 from the first images 102. The computer 100 can store a list of the categories 106 whose pixels should be masked ("masked categories"), which can be a subset of the list of categories 106. The masked categories 106a can be chosen based on which categories 106 tend to cause artifacts or inaccuracies when generating the three-dimensional representation 108 (described below). For example, the masked categories 106a can include sky. For another example, the masked categories 106a can include small objects (e.g., significantly smaller than a vehicle 114) located in a high position (e.g., well above a typical height of a vehicle 114), e.g., traffic lights, kites, etc. Masking the pixels can be performed by setting all the pixels in a masked category 106a to a value that indicates that the pixels should be ignored when generating the three-dimensional representation 108, e.g., set to black. The computer 100 retains the pixels in the unmasked categories 106b at their original values. The computer 100 generates the masked first images 110 by masking the pixels in the masked categories 106a.

Figure 6:
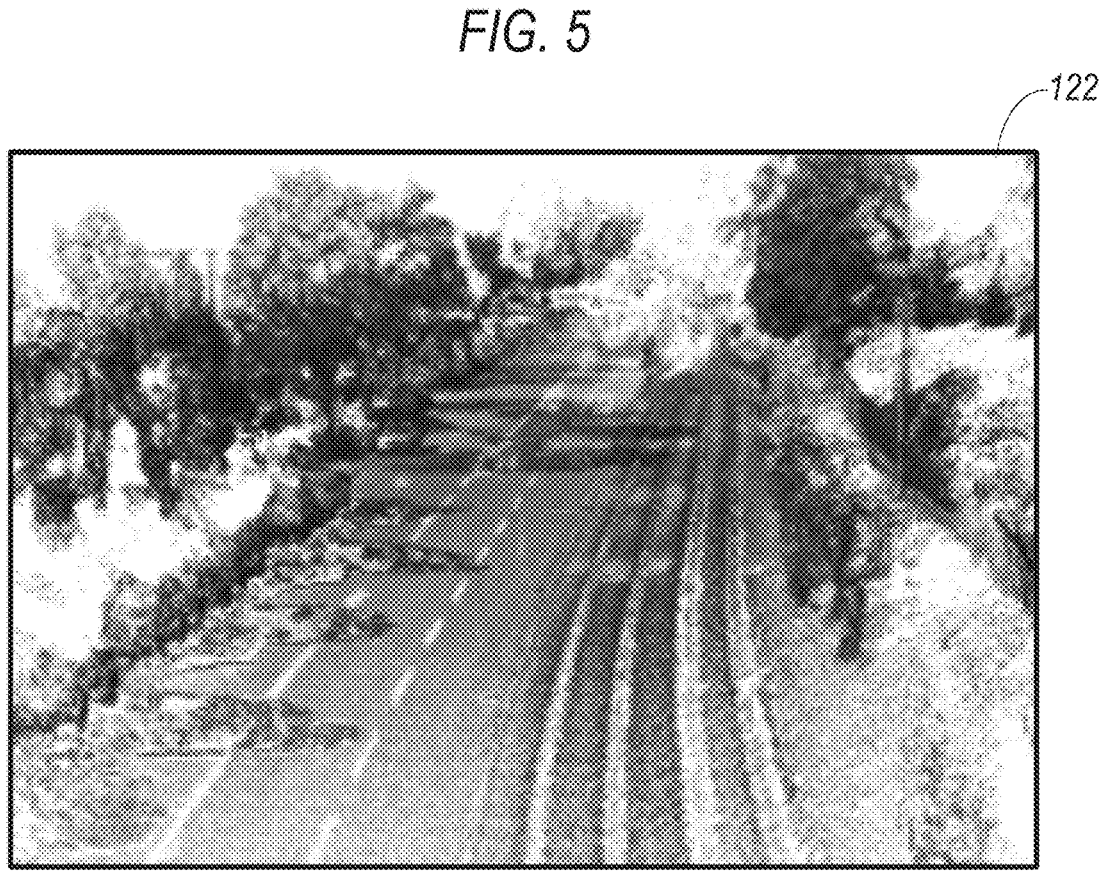
FIG. 6 is a diagram of an example point cloud of the environment.
Figure 7:
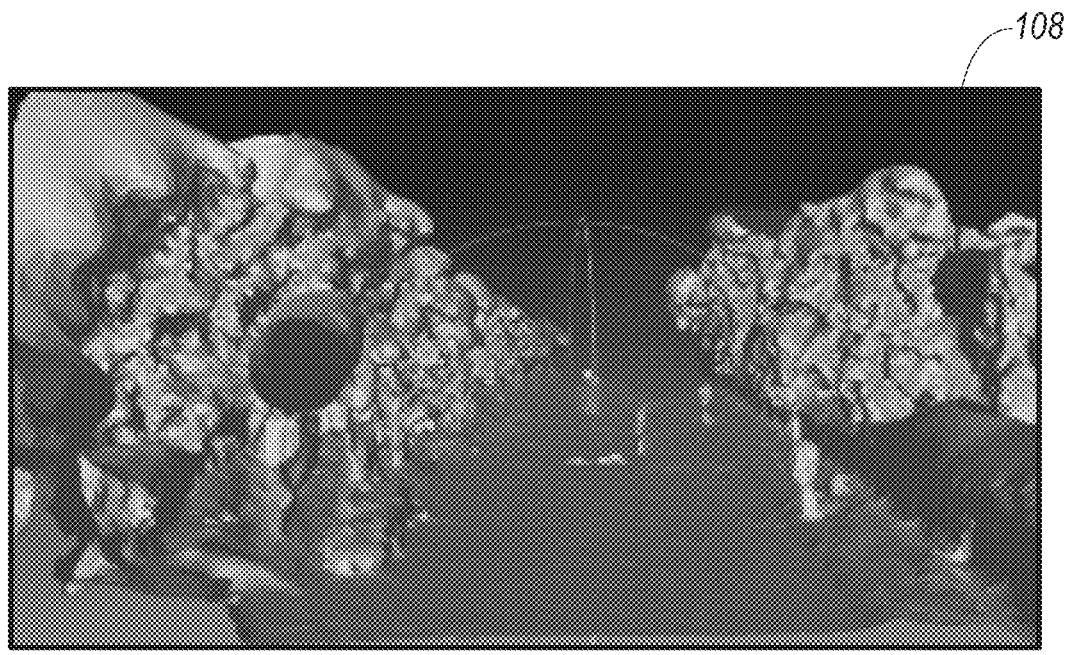
FIG. 7 is an image of an example mesh of the environment.

With reference to FIGS. 6 and 7, the computer 100 can generate the three-dimensional representation 108 of the environment 104. The three-dimensional representation 108 is data defining positions and orientations in space for points, edges, surfaces, etc., which can be manipulated to approximate the objects, terrain, etc. of the environment 104. The three-dimensional representation 108 can be any suitable type, e.g., a mesh, a point cloud 122, etc. As a mesh, the three-dimensional representation 108 can include a plurality of vertices, edges connecting the vertices, and polygons circumscribed by the edges. The mesh can be a polyhedral representation of the environment 104.

Generating the three-dimensional representation 108 of the environment 104 can be based on the masked first images 110. For example, generating the three-dimensional representation 108 of the environment 104 as a mesh can include generating a point cloud 122 based on the masked first images 110 and generating the mesh based on the point cloud 122, as will be described in turn. Using the masked first images 110 rather than the unmasked first images 102 can prevent artifacts in the three-dimensional representation 108, e.g., the sky being represented as surface capable of casting shadows. Such artifacts could be prevented by using images from perspectives 113 extending 360° around the environment 104, but as described above, it can be difficult to gather such images from the roadway 120 through an environment 104. Using the masked first images 110 permits the first images 102 taken from the roadway 120 to be used without generating artifacts in the three-dimensional representation 108.

With reference to FIG. 6, generating the three-dimensional representation 108 can include generating the point cloud 122 based on the masked first images 110. The point cloud 122 is a set of points having spatial positions. Generating the point cloud 122 can include executing a machine-learning algorithm, and the masked first images 110 can be inputs to the machine-learning program. For example, the machine-learning algorithm can be a structure-from-motion (SfM) algorithm followed by a multiview stereo (MVS) algorithm, e.g., COLMAP.

With reference to FIG. 7, generating the three-dimensional representation 108 can include generating the mesh based on the point cloud 122. Generating the mesh can include executing a meshing algorithm such as Delauney triangulation or Poisson surface reconstruction, and the point cloud 122 can be an input to the meshing algorithm. In particular, the meshing algorithm can be Poisson surface reconstruction, which can generate flat surfaces with less noise than other meshing algorithms, reducing shadow artifacts resulting from the noise.

Figure 8:
FIG. 8 is an image of an example shadow mask of the environment in the first lighting condition.
Figure 9:
FIG. 9 is an image of an example shadow mask of the environment in a second lighting condition.

With reference to FIGS. 8 and 9, the computer 100 can generate first shadow masks 124 of the environment 104 in the first lighting condition from the respective perspectives 113 of the first images 102 (i.e., first shadow masks 124 of the first images 102) and a second shadow mask 126 of the environment 104 in the second lighting condition from the perspective of the first one of the first images 102, both based on the three-dimensional representation 108. A shadow mask indicates locations of shadows in an image. The computer 100 can generate a plurality of second shadow masks 126, one for each of a plurality of the second images 112 that will be generated as described below. Generating the shadow masks 124, 126 can include projecting objects in the three-dimensional representation 108 along the light direction of the respective lighting condition. The objects are projected onto surfaces in the three-dimensional representation 108, and those surfaces are thereby determined to be in shadow. Those shadows are then projected onto an image plane of the respective one of the first images 102 to create the respective shadow mask 124, 126. The first shadow masks 124 and the second shadow masks 126 can both be from the perspective of the respective one of the first images 102. The first shadow masks 124 can be of the environment 104 in the first lighting condition, and the second shadow masks 126 can be of the environment 104 in the second lighting condition. The first shadow masks 124 and the second shadow masks 126 can be used directly as inputs in the step of generating the second images 112 below, or the first shadow masks 124 and the second shadow masks 126 as just described can be preliminary shadow masks 124a, 126a that will be further refined, as will now be described.

With reference to FIG. 8, generating the first shadow masks 124 can include executing a machine-learning algorithm to turn the preliminary first shadow masks 124a into refined first shadow masks 124b. The refined first shadow masks 124b can be of the environment 104 from the perspectives 113 of the respective first images 102 in the first lighting condition. The first images 102 and the preliminary first shadow masks 124a can be inputs to the machine-learning algorithm. Using the first images 102 as inputs can provide a corrective for inaccuracies in the preliminary first shadow masks 124a resulting from inaccuracies in the three-dimensional representation 108. The machine-learning algorithm can be, e.g., an encoder-decoder neural network. The machine-learning algorithm can be trained on a dataset of artificially generated images of environments 104 made using three-dimensional representations of the environments 104 (different than the three-dimensional representations 108 discussed above). The three-dimensional representations can include colors and/or textures. The three-dimensional representations can be constructed, and then images and shadow masks can be generated from the three-dimensional representations. The images can serve as inputs to the machine-learning program during training, and the shadow masks can serve as ground truth during training.

With reference to FIG. 9, generating the second shadow masks 126 can include executing a machine-learning algorithm to turn the preliminary second shadow masks 126a into refined second shadow masks 126b. The refined second shadow masks 126b can be of the environment 104 from the perspectives 113 of the plurality of the first images 102 (or of a subset of the plurality of the first images 102, or of the first one of the first images 102 if only a single second image 112 is being generated) in the second lighting condition. The first images 102 and the preliminary second shadow masks 126a can be inputs to the machine-learning algorithm. Using the first images 102 as inputs can provide a corrective for inaccuracies in the preliminary second shadow masks 126a resulting from inaccuracies in the three-dimensional representation 108. For example, for each pixel in shadow in one of the preliminary second shadow masks 126a, the computer 100 can apply a weighted-average color from the first images 102 by casting a ray in the light direction (e.g., sun angle) from a first point in the three-dimensional representation 108 corresponding to the pixel, selecting a second point in the three-dimensional representation 108 that the ray intersects (i.e., that occludes the first point), reprojecting the second point in the other first images 102, sampling the colors from the reprojections, and applying weights to those colors. Here is an example equation for applying the weights:

$$\frac{1}{\|x_0 - p_i(x_0)\|_2^2 \cdot \left|1 + c_i^T d_{sun}\right|^2 + \varepsilon}$$

in which $x_0$ is the second (occluding) point, $c_i$ is a unit vector of the direction from the camera 116 that took the ith first image 102, $p_i$ is the first intersection of the vector $c_i$ with the three-dimensional representation 108, and & is a very small number to prevent division by zero. The first term in the denominator reduces the contribution of the ith first image 102 when the second point $x_0$ is occluded from the camera 116, and the second term in the denominator compensates for depth inaccuracy.

The machine-learning program for generating the second shadow masks 126 can operate independently of the machine-learning program for generating the first shadow masks 124. Independent operation can prevent the preliminary second shadow masks 126a from decreasing the accuracy of the refined first shadow masks 124b. The machine-learning algorithm can be, e.g., an encoder-decoder neural network. The machine-learning algorithm can be trained on a dataset of artificially generated images of environments 104 made using three-dimensional representations of the environments 104 (different than the three-dimensional representations 108 discussed above). The three-dimensional representations can include colors and/or textures. The three-dimensional representations can be constructed, and then images and shadow masks can be generated from the three-dimensional representations. The images can serve as inputs to the machine-learning program during training, and the shadow masks can serve as ground truth during training.

The computer 100 can generate a plurality of normal maps of the environment 104 from the perspectives 113 of the respective first images 102 based on the three-dimensional representation 108. A normal map includes surface normals, i.e., vectors perpendicular to respective surfaces, for points on surfaces of the environment 104 shown in a respective one of the first images 102. For example, for each normal map, the computer 100 can calculate the surface normal for each polygon of the mesh visible from the perspective of the respective first image 102.

The computer 100 can generate reflectance maps of the environment 104 from the perspectives 113 of the respective first images 102 based on the three-dimensional representation 108, e.g., based on the respective normal maps that are based on the three-dimensional representation 108, and based on the second lighting condition, e.g., the lighting direction of the second lighting condition. The reflectance maps can be maps of specular reflection direction based on the light direction of the second lighting direction. For example, the reflectance maps can include, for each surface or pixel shown, the dot product between the direction from the camera 116 to the surface and the mirror reflection of the incoming light ray at the surface (known from the light direction and the surface normal), i.e., how much the direction of the camera 116 projects onto the reflected light.

Figure 10:
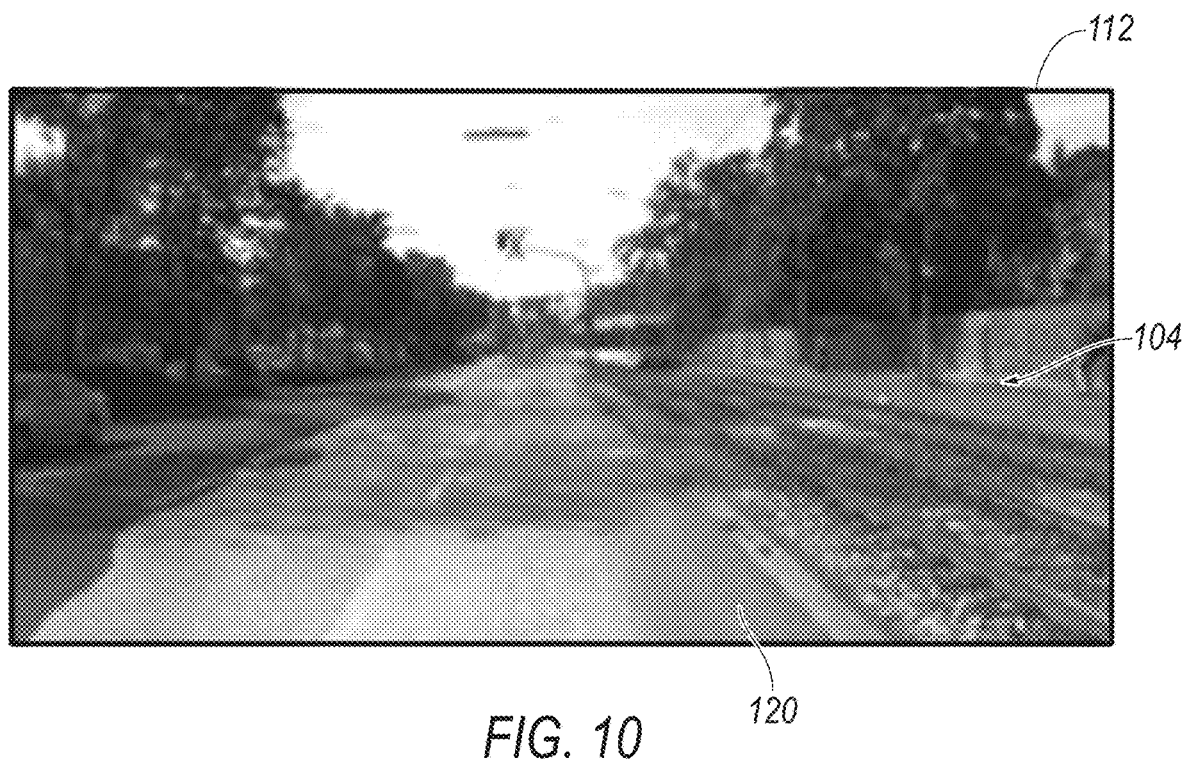
FIG. 10 is an artificial image of the environment in the second lighting condition.

With reference to FIG. 10, the computer 100 can generate the second images 112 of the environment 104 in the second lighting condition based on the three-dimensional representation 108 and on the first images 102. For example, each second image 112 can be based on the respective first shadow mask 124, the respective second shadow mask 126, and/or the respective reflectance map, all of which are based on the three-dimensional representation 108 and taken from the perspective of the respective one of the first images 102. Each second image 112 can have a same perspective of the environment 104 as the respective one of the first images 102 does. For the purposes of this disclosure, a perspective of an image is defined as a point of view of a camera 116 that captured that image or, for artificially generated images, a point of view of a hypothetical camera that would have captured that image.

For example, generating the second images 112 can include executing a machine-learning program. The first images 102, the first shadow masks 124 (preliminary or refined), the second shadow masks 126 (preliminary or refined), the reflectance maps, and the light direction of the second lighting condition can be the inputs to the machine-learning algorithm. The light direction can be represented as, e.g., a unit vector. The machine-learning algorithm can be, e.g., a convolutional neural network. The machine-learning algorithm can be trained on a dataset of artificially generated images of environments 104 made using three-dimensional representations of the environments 104 (different than the three-dimensional representations 108 discussed above). The three-dimensional representations can include colors and/or textures. The three-dimensional representations can be constructed, and then images and shadow masks can be generated from the three-dimensional representations. The images can serve as inputs to the machine-learning program during training, and the shadow masks can serve as ground truth during training. The machine-learning algorithm for generating the second images 112 can be jointly trained with the machine-learning algorithms for refining the first shadow masks 124 and second shadow masks 126. Jointly training the machine-learning algorithms can improve how useful the first shadow masks 124 and second shadow masks 126 are to the machine-learning algorithm for generating the second images 112.

Figure 11:
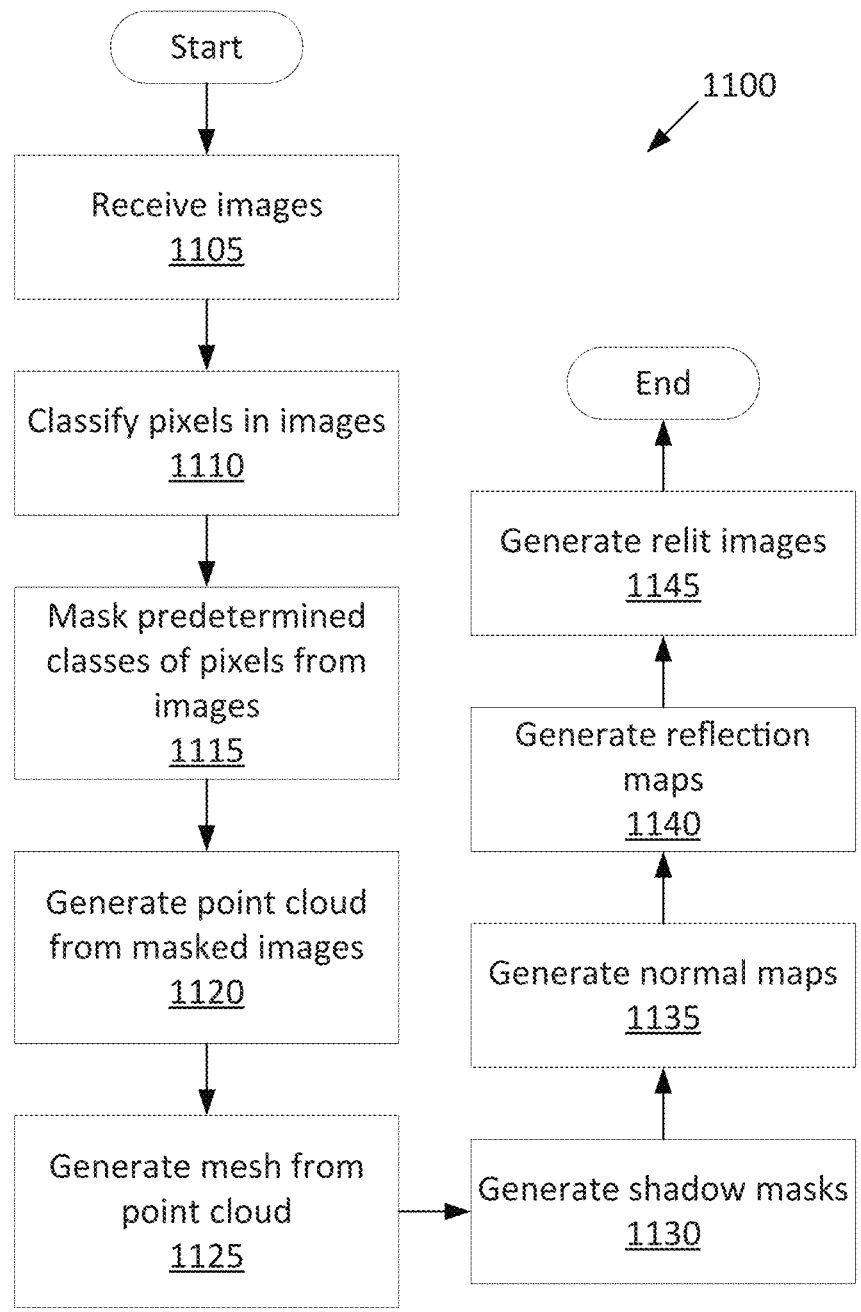
FIG. 11 is a process flow diagram of an example process for generating the artificial image of the environment in the second lighting condition.

FIG. 11 is a process flow diagram illustrating an exemplary process 1100 for generating the second images 112 of the environment 104 in the second lighting condition. The memory of the computer 100 stores executable instructions for performing the steps of the process 1100. As a general overview of the process 1100, the computer 100 receives the first images 102, classifies the pixels in the first images 102 into the categories 106, masks the pixels belonging to the masked categories 106a, generates the point cloud 122 based on the masked first images 110, generates the mesh based on the point cloud 122, generates the shadow masks 124, 126, generates the normal maps, generates the reflectance maps, and generates the second images 112.

The process 1100 begins in a block 1105, in which the computer 100 receives a plurality of the first images 102 of the environment 104 in the first lighting condition, as described above.

Next, in a block 1110, the computer 100 classifies the pixels of the first images 102 into the categories 106, as described above.

Next, in a block 1115, the computer 100 masks the pixels belonging to the masked categories 106a, thereby generating the masked first images 110, as described above.

Next, in a block 1120, the computer 100 generates the point cloud 122 based on the masked first images 110, as described above.

Next, in a block 1125, the computer 100 generates the mesh based on the point cloud 122, as described above.

Next, in a block 1130, the computer 100 generates the first shadow masks 124 and the second shadow masks 126, as described above. The computer 100 can either generate the preliminary shadow masks 124a, 126a to use as the first shadow masks 124 and the second shadow masks 126, or the computer 100 can refine the preliminary shadow masks 124a, 126a and use the refined shadow masks 124b, 126b as the first shadow masks 124 and second shadow masks 126. Generating the shadow masks 124, 126 in the block 1130 can occur before, concurrently with, or after generating the normal maps and the reflectance maps in blocks 1135 and 1140.

Next, in a block 1135, the computer 100 generates the normal maps of the environment 104 from the perspectives 113 of the respective first images 102 based on the three-dimensional representation 108 (e.g., the mesh), as described above.

Next, in a block 1140, the computer 100 generates the reflectance maps of the environment 104 from the perspectives 113 of the respective first images 102 based on the three-dimensional representation 108 (e.g., the mesh), e.g., based on the normal maps, and based on the light direction of the second lighting condition, as described above.

Next, in a block 1145, the computer 100 generates the second images 112 of the environment 104 in the second lighting condition based on the respective first images 102 and on the three-dimensional representation 108, e.g., based on the first shadow masks 124, the second shadow masks 126, and the reflectance maps, as described above. After the block 1145, the process 1100 ends.

Figure 12:
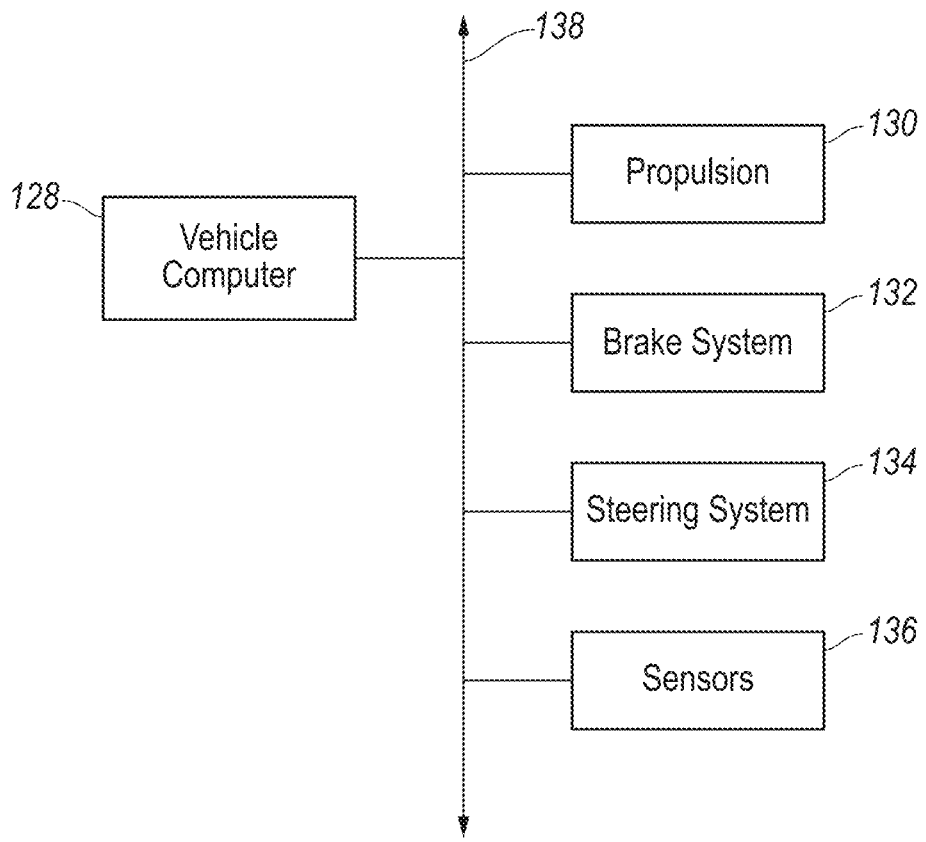
FIG. 12 is a block diagram of an example vehicle.

With reference to FIG. 12, the vehicle 114 may be an autonomous vehicle. A vehicle computer 128 can be programmed to operate the vehicle 114 independently of the intervention of a human operator, completely or to a lesser degree. The vehicle computer 128 may be programmed to operate a propulsion 130, a brake system 132, a steering system 134, and/or other vehicle systems based on data received from sensors 136. For the purposes of this disclosure, autonomous operation means the vehicle computer 128 controls the propulsion 130, brake system 132, and steering system 134 without input from a human operator; semi-autonomous operation means the vehicle computer 128 controls one or two of the propulsion 130, brake system 132, and steering system 134 and a human operator controls the remainder; and nonautonomous operation means a human operator controls the propulsion 130, brake system 132, and steering system 134.

The vehicle computer 128 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 128 can thus include a processor, a memory, etc. The memory of the vehicle computer 128 can include media for storing instructions executable by the processor as well as for electronically storing data and/or databases, and/or the vehicle computer 128 can include structures such as the foregoing by which programming is provided. The vehicle computer 128 can be multiple computers coupled together.

The computer may transmit and receive data through a communications network 138 such as a controller area network (CAN) bus, Ethernet, WiFi, Local Interconnect Network (LIN), onboard diagnostics connector (OBD-II), and/or by any other wired or wireless communications network. The computer may be communicatively coupled to the sensors 136, the propulsion 130, the brake system 132, the steering system 134, and other components via the communications network 138.

The sensors 136 may provide data about operation of the vehicle 114, for example, wheel speed, wheel orientation, and engine and transmission data (e.g., temperature, fuel consumption, etc.). The sensors 136 may detect the location and/or orientation of the vehicle 114. For example, the sensors 136 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 136 may detect the external world, e.g., objects and/or characteristics of surroundings of the vehicle 114, such as other vehicles, road lane markings, traffic lights and/or signs, pedestrians, etc. For example, the sensors 136 may include radar sensors, scanning laser range finders, light detection and ranging (LIDAR) devices, and image processing sensors such as the cameras 116.

The propulsion 130 of the vehicle 114 generates energy and translates the energy into motion of the vehicle 114. The propulsion 130 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 130 can include an electronic control unit (ECU) or the like that is in communication with and receives input from the computer and/or a human operator. The human operator may control the propulsion 130 via, e.g., an accelerator pedal and/or a gear-shift lever.

The brake system 132 is typically a conventional vehicle braking subsystem and resists the motion of the vehicle 114 to thereby slow and/or stop the vehicle 114. The brake system 132 may include friction brakes such as disc brakes, drum brakes, band brakes, etc.; regenerative brakes; any other suitable type of brakes; or a combination. The brake system 132 can include an electronic control unit (ECU) or the like that is in communication with and receives input from the computer and/or a human operator. The human operator may control the brake system 132 via, e.g., a brake pedal.

The steering system 134 is typically a conventional vehicle steering subsystem and controls the turning of the wheels. The steering system 134 may be a rack-and-pinion system with electric power-assisted steering, a steer-by-wire system, as both are known, or any other suitable system. The steering system 134 can include an electronic control unit (ECU) or the like that is in communication with and receives input from the computer and/or a human operator. The human operator may control the steering system 134 via, e.g., a steering wheel.

Figure 13:
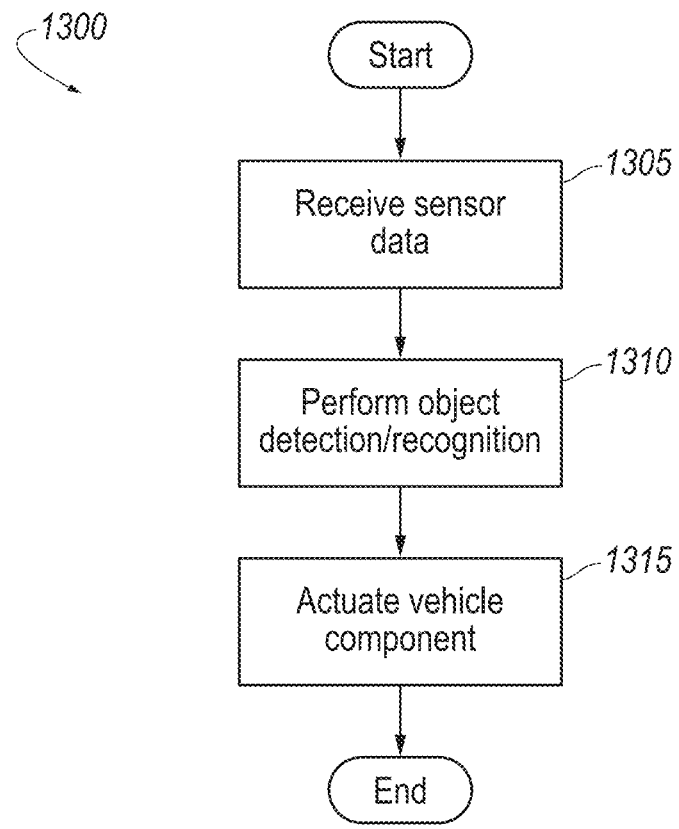
FIG. 13 is a process flow diagram of an example process for operating the vehicle using a machine-learning algorithm trained on the artificial images.

FIG. 13 is a process flow diagram illustrating an exemplary process 1300 for autonomously or semi-autonomously operating a vehicle 114 using a machine-learning algorithm trained on the first images 102 and second images 112. The vehicle 114 can be different than the vehicle 114 that collected the first images 102. The memory of the vehicle computer 128 stores executable instructions for performing the steps of the process 1300 and/or programming can be implemented in structures such as mentioned above. As a general overview of the process 1300, the vehicle computer 128 receives data from the sensors 136, performs object detection and/or recognition on the data, and actuates a component of the vehicle 114 based on the object detection and/or recognition.

The process 1300 begins in a block 1305, in which the vehicle computer 128 receives data from the sensors 136, including images from the cameras 116.

Next, in a block 1310, the vehicle computer 128 performs object detection and/or recognition on the images. The object detection and/or recognition can be performed by using a machine-learning algorithm trained on the first images 102 and second images 112, e.g., a convolutional neural network. The machine-learning algorithm trained using the second images 112 may be able to better detect or recognize objects than if the machine-learning algorithm were trained on a different dataset.

Next, in a block 1315, the vehicle computer 128 actuates at least one vehicle component of the vehicle 114 based on the detected and/or recognized objects. For example, the vehicle computer 128 can actuate at least one of the propulsion 130, the brake system 132, or the steering system 134. For example, the vehicle computer 128 may actuate the brake system 132 based on the distances to the detected objects as part of an automatic-braking feature, e.g., braking to prevent the vehicle 114 from contacting one of the objects. The vehicle computer 128 can, if any of the detected objects are positioned in front of the vehicle 114 and are within a distance threshold of the vehicle 114, instruct the brake system 132 to actuate. The distance threshold can be chosen based on a stopping distance of the vehicle 114 and may vary with a speed of the vehicle 114. For another example, the vehicle computer 128 may operate the vehicle 114 autonomously, i.e., actuating the propulsion 130, the brake system 132, and the steering system 134 based on the identities of the objects, e.g., to navigate the vehicle 114 around the objects in the environment. For example, the vehicle computer 128 may navigate the vehicle 114 to provide a larger buffer if the object is a type that moves, e.g., motorcycle, than a type that is stationary, e.g., mailbox. After the block 1315, the process 1300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory storing instructions executable by the processor to:
   receive a plurality of first images of an environment in a first lighting condition;
   classify pixels of the first images into categories;
   mask the pixels belonging to at least one of the categories from the first images;
   generate a three-dimensional representation of the environment based on the masked first images;
   generate a first shadow mask of the first one of the first images, wherein generating the first shadow mask includes executing a second machine-learning algorithm, and the first images are inputs to the second machine-learning algorithm;
   generate a second shadow mask of the environment in the second lighting condition from a perspective of the first one of the first images, wherein generating the second shadow mask includes executing a third machine-learning algorithm, and the first images are inputs to the third machine-learning algorithm; and
   generate a second image of the environment in a second lighting condition based on the three-dimensional representation, on a first one of the first images, on the first shadow mask, and on the second shadow mask, wherein generating the second image includes executing a first machine-learning algorithm; and the first one of the first images, the first shadow mask, and the second shadow mask are inputs to the first machine-learning algorithm.

2. The computer of claim 1, wherein the second image and the first one of the first images have a same perspective of the environment.

3. The computer of claim 1, wherein the instructions further include instructions to generate a plurality of second images including the second image based on the three-dimensional representation and on the first images, the second images being in the second lighting condition.

4. The computer of claim 3, wherein each second image has a same perspective of the environment as respective ones of the first images.

5. The computer of claim 1, wherein the at least one of the categories includes sky.

6. The computer of claim 1, wherein the first images are of the environment at a series of points along a path through the environment.

7. The computer of claim 6, wherein the path extends along a roadway of the environment.

8. The computer of claim 1, wherein the three-dimensional representation is a mesh.

9. The computer of claim 8, wherein generating the mesh includes generating a point cloud based on the masked first images and generating the mesh based on the point cloud.

10. The computer of claim 9, wherein generating the point cloud includes executing a fourth machine-learning algorithm, and the masked first images are inputs to the fourth machine-learning algorithm.

11. The computer of claim 1, wherein the instructions further include instructions to generate a shadow mask of the environment in the second lighting condition from a perspective of the first one of the first images, and generating the second image is based on the shadow mask.

12. The computer of claim 1, wherein the second lighting condition includes a light direction, and generating the second shadow mask includes determining shadow locations by projecting objects in the three-dimensional representation along the light direction.

13. The computer of claim 1, wherein the second lighting condition includes a light direction, generating the second shadow mask includes determining a preliminary second shadow mask having shadow locations by projecting objects in the three-dimensional representation along the light direction, and the preliminary second shadow mask is an input to the second machine-learning algorithm.

14. The computer of claim 1, wherein the instructions further include instructions to generate a reflectance map of the environment from a perspective of the first one of the first images based on the three-dimensional representation, the reflectance map is a map of specular reflection direction based on a light direction of the second lighting condition, and generating the second image is based on the reflectance map.

15. The computer of claim 14, wherein the instructions further include instructions to generate a normal map of the environment from the perspective of the first one of the first images based on the three-dimensional representation, and generating the reflectance map is based on the normal map and the second lighting condition.

16. A method comprising:
receiving a plurality of first images of an environment in a first lighting condition;
classifying pixels of the first images into categories;
masking the pixels belonging to at least one of the categories from the first images;
generating a three-dimensional representation of the environment based on the masked first images;
generating a first shadow mask of the first one of the first images, wherein generating the first shadow mask includes executing a second machine-learning algorithm, and the first images are inputs to the second machine-learning algorithm;
generating a second shadow mask of the environment in the second lighting condition from a perspective of the first one of the first images, wherein generating the second shadow mask includes executing a third machine-learning algorithm, and the first images are inputs to the third machine-learning algorithm; and
generating a second image of the environment in a second lighting condition based on the three-dimensional representation, on a first one of the first images, on the first shadow mask, and on the second shadow mask, wherein generating the second image includes executing a first machine-learning algorithm; and the first one of the first images, the first shadow mask, and the second shadow mask are inputs to the first machine-learning algorithm.

\* \* \* \* \*